0
United States Patent [19]

Fischer et al.

[11] 4,036,764

[45] July 19, 1977

[54] METHOD OF FOAM DRILLING USING A SULFOACETATE FOAMING AGENT

[75] Inventors: Paul W. Fischer, Whittier; David S. Pye, Brea, both of Calif.

[73] Assignee: Union Oil Company of California, Brea, Calif.

[21] Appl. No.: 621,685

[22] Filed: Oct. 14, 1975

[51] Int. Cl.² .......................... C09K 7/08; C09K 7/02
[52] U.S. Cl. .................... 252/8.5 C; 166/69; 166/71
[58] Field of Search .............. 252/8.5 C, 8.5 R, 307, 252/354; 175/71, 69

[56] References Cited

U.S. PATENT DOCUMENTS

| 2,166,144 | 7/1939 | Harris | 252/354 X |
|---|---|---|---|
| 3,463,231 | 8/1969 | Hutchison et al. | 175/69 X |
| 3,486,560 | 12/1969 | Hutchison et al. | 175/69 X |
| 3,572,439 | 3/1971 | Hutchison et al. | 252/8.5 X |

*Primary Examiner*—Herbert B. Guynn
*Attorney, Agent, or Firm*—Richard C. Hartman; Dean Sandford; John E. Vanderburgh

[57] ABSTRACT

A method of conducting foam drilling and workover operations in a bore hole penetrating a subterranean formation, particularly a high-temperature formation such as a geothermal formation, employing an aqueous solution of a foaming agent having the formula:

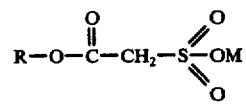

wherein R is a straight chain alkyl radical having from 10 to 16 carton atoms; and M is an alkali metal or ammoniun cation, with sodium being preferred. A particularly preferred foaming agent is sodium lauryl sulfoacetate.

9 Claims, No Drawings

METHOD OF FOAM DRILLING USING A SULFOACETATE FOAMING AGENT

BACKGROUND OF THE INVENTION

1. Field of the Invention

This invention relates to the drilling and workover of wells penetrating subterranean formations, particularly high-temperature formations, such as geothermal formations, and more particularly to the drilling of such formations with foam drilling fluids.

2. Description of the Prior Art

It has long been conventional practice in the drilling of bore holes penetrating subterranean formations to circulate a drilling fluid down the drill pipe and back up the bore hole annulus for the removal of debris and drill cuttings from the bore hole. Drilling fluid also serves to prevent sloughing in the bore hole during the drilling operation. Recently, air and gas have replaced conventional drilling fluids in the drilling of some bore holes, and have proved particularly beneficial in formations wherein dense conventional drilling fluids would be lost to the formation. Additionally, air and gas have also provided longer bit life and higher rates of penetration in the drilling of bore holes.

However, in many formations, water enters the bore hole from adjacent water-containing strata; and air and gas have proved unable to remove this water. In view of this problem, foams have been developed to remove both the cuttings and the water from these bore holes. Numerous foam compositions have been proposed and used; however, as yet, foams have not been satisfactorily used in the drilling and workover of wells penetrating high-temperature subterranean formations, such as geothermal formations.

At present, geothermal formations are drilled using air or other gases as the drilling or workover fluid. This is particularly true in the vapor-dominated geothermal reservoirs wherein the low bottom-hole pressure precludes the use of heavy drilling fluids, such as conventional drilling muds. If used, circulation of these conventional drilling fluids would quickly be lost to the low-pressure formation. Also, the high temperatures of the geothermal reservoirs have precluded the use of foams normally used in the typically low-temperature, oil-bearing formations. While the temperature of typical oil-bearing formations amenable to foam drilling may reach as high as 200° F., the geothermal wells now being drilled have bottom-hole temperatures of from about 400° F. to about 700° F. Because these high-temperatures greatly reduce foam stability, foams have not been used as drilling or workover fluids in wells penetrating high-temperature subterranean formations, such as wells penetrating geothermal formations. Thus there is a need for a drilling and workover method which employs a foam that is stable at high temperatures and which can be used in high-temperature subterranean formations.

Accordingly, a principal object of this invention is to provide a method of conducting foam drilling and workover operations in subterranean formations.

Yet another object of this invention is to provide a method of conducting foam drilling and workover operations in high-temperature subterranean formations.

Still another object of this invention is to provide a method of conducting foam drilling and workover operations in high-temperature geothermal formations.

A still further object of this invention is to provide a method of conducting foam drilling and workover operations in high-temperature subterranean formations which employs a foaming agent that is stable at the temperatures encountered.

Yet still another object of this invention is to provide a method of conducting foam drilling and workover operations in geothermal formations which employs a foaming agent that is stable at the temperatures encountered.

Other objects and advantages of this invention will become apparent to those skilled in the art from the following description.

SUMMARY OF THE INVENTION

Briefly, this invention provides a method of conducting foam drilling and workover operations in subterranean formations which employs a foam having stability at high temperatures. The foam is formed by contacting a gas at an elevated pressure with an aqueous solution of an alkali metal or ammonium salt of a carboalkoxy methane sulfonic acid wherein the alkyl radical is straight chained and has from 10 to 16 carbon atoms. While the method of this invention is useful in low-temperature subterranean formations, is has particular utility in high-temperature subterranean formations, such as those having temperatures above 200° F., and particularly above 400° F. The method of this invention is particularly suited for use in geothermal formations.

DETAILED DESCRIPTION OF THE INVENTION

In one conventional mode of conducting foam drilling and workover operations, an aqueous foaming solution and a gas are injected at an elevated pressure through the drill pipe penetrating the subterranean formation, and the foam generated by contact of the foaming solution and the gas is caused to travel up the bore hole annulus so that the foam carries the drill cuttings, liquids and other debris from the bottom of the bore hole to the surface of the earth. In modifications of this conventional mode, the foam can be preformed at the surface before injection into the bore hole. Alternatively, the two fluids can be injected simultaneously, but separately, down separate conduits and allowed to mix at the bottom of the hole. For example, in the drilling of a bore hole, the gas can be injected down a separate central pipe within the drill pipe, and the foaming solution can be injected down the annulus between the central pipe and the drill pipe. In some cases the gas can be injected down the annulus between the central pipe and the drill pipe, while the foaming solution is injected down the central pipe. The fluid injected down the central pipe will emerge from the drill pipe via ports in the drill bit. The fluid injected down the annulus will exit the drill pipe through perforations near the drill bit. It may be desired in conducting a foam drilling operation to inject the gas down the central pipe and the foaming solution down the annulus. This method reduces the loss of lubrication in the drill bit as a result of the detergent action of the foaming solution and also prevents the corrosion of the drill bit as a result of the direct contact of the foaming solution on the now lubricant-free drill bit surfaces.

The aqueous foaming solution employed in the method of this invention is an admixture of water and a foaming agent. The foaming agent is an alkali metal or ammonium salt of a carboalkoxy methane sulfonic acid, wherein the alkyl radical is straight chained and has from 10 to 16 carbon atoms, and is characterized by the following generalized formula:

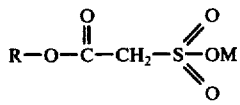

wherein R is the alkyl radical; and M is the alkali metal or ammonium cation, with the sodium cation being preferred. Specifically, the alkyl radical can be n-decyl, n-undecyl, n-dodecyl, n-tridecyl, n-tetradecyl, n-pentadecyl, or n-hexadecyl. A particularly preferred foaming agent is sodium lauryl sulfoacetate, which has the formula described above wherein R is a n-dodecyl radical and M is a sodium cation, and which is marketed by the Stepan Chemical Company under the trademark Lathanol LAL 70.

The aqueous foaming solution is prepared by admixing the foaming agent in water, such that the solution contains about 0.25 to 10 weight percent of the foaming agent, preferably about 0.5 to 2 weight percent, and more preferably about 1 weight percent of the foaming agent. Optionally, other ingredients such as corrosion inhibitors and scale deposition inhibitors may be added to the foaming solution.

The gas which is used with the foaming solution to generate the foam can be nitrogen, natural gas, methane, butane, carbon dioxide, or air, with air being preferred. The foam itself will contain, measured at the existing bottom-hole pressure, about 90 to 99.5 volume percent of the gas, and correspondingly about 0.5 to 10 volume percent of the foaming solution.

The injection rates of the two fluids will be determined by the conditions existing in the bore hole, the desired velocity of the foam flowing up the bore hole annulus, and the size of the bore hole annulus. The relative rates of injection will be determined by the desired gas-liquid composition of the foam at the prevailing bottom-hole pressure. In most foam drilling operations, it is preferred that the velocity of the foam be in the range of from 80 to 600 feet per minute; however lower velocities can be useful.

Because the method of this invention is particularly useful in high-temperature subterranean formations, it is desired to maintain sufficient pressure in the bore hole to prevent the liquid portion of the foam from flashing. For this reason, the top of the bore hole may be sealed so that the bore hole annulus does not directly communicate with the atmosphere; and the conduit at the surface for discharging the foam may be equipped with a valve for supplying the necessary back pressure to the bore hole.

This invention is further described by the following examples which are illustrative of various aspects of the invention and are not intended as limiting the scope of the invention as defined by the appended claims.

EXAMPLE 1

A series of tests are conducted to determine the foaming ability and foam stability of three aqueous foaming solutions, the first two of which contain foaming agents which have been satisfactorily used in low-temperature subterranean formations, and the third solution contains one of the preferred foaming agents of this invention.

The first aqueous foaming solution contains 1.0 weight percent of a polyethyleneoxide foaming agent marketed by the Nalco Chemical Company under the trademark Adofoam. The second aqueous foaming solution contains 1.0 weight percent of a linear alkyl-aryl sodium sulfonate foaming agent marketed by the Textilana Corporation under the trademark Sulfotex LAS 100. The third aqueous foaming solution contains 1.0 weight percent of a sodium lauryl sulfoacetate foaming agent marketed by the Stepan Chemical Company under the trademark Lathanol LAL 70.

Twenty-five ml of each solution is placed in separate long glass tubes having a frittered disc at the bottom. Air is forced through the frittered discs at a constant rate until each solution is totally foamed. The total height of each foam is then determined as a measure of the foaming ability of each solution. Then the half-life of each foam is determined as a measure of each foam's stability. The half-life is defined as the time required for the foam to break to one-half of its original height. In measuring the half-life, if the foam has not broken to one-half of its original height by the end of two hours, a half-life in excess of 2 hours is indicated. The above tests are made at room temperature, and the results are reported in Table 1.

Next, 25 ml of each solution is placed in a high-temperature bomb and heated for two hours at 450° F. After heating, the solutions are cooled to room temperature and the foaming ability and foam stability of each solution is determined. This test is designed to measure the effect of high temperature upon the foaming ability and foam stability of the three foaming agents. The results are reported in Table 1.

TABLE 1

|  | With no Heating | | | After Heating | | |
|---|---|---|---|---|---|---|
|  | Wt. % | Foam height, mm | Foam half-life | Wt. % | Foam height, mm | Foam half-life |
| Adofoam | 1.0 | 57.5* | 21.5* min | 1.0 | 55* | 3* sec |
| Sulfotex LAS 100 | 1.0 | 60 | 30 min | 1.0 | 0 | 0 |
| Lathanol LAL 70 (Sodium lauryl sulfoacetate) | 1.0 | 55 | >2 hrs | 1.0 | 58 | >2 hrs. |

*Average of two tests

As Table 1 indicates, with no heating of the foaming solutions, all three solutions have approximately the same foaming ability. However, the preferred foaming solution of this invention has a foam stability far in excess of the other two foaming solutions. As Table 1 further indicates, after being heated at 450° F. for two hours, the foam stabilities (half-life) of the foaming solutions containing Adofoam and Sulfotex LAS 100 have been completely destroyed, while the foaming ability of the solution containing sodium lauryl sulfoacetate remains substantially unchanged and the foam stability remains in excess of 2 hours.

These results demonstrate that while two foaming solutions, containing foaming agents which have been satisfactorily used in low-temperature subterranean formations, exhibit no foam stability after being heated to 450° F., the foaming solution used in the method of this invention exhibits excellent foaming ability and foam stability after being heated to 450° F., and therefore would provide a superior foaming solution for use in high-temperature subterranean formations.

EXAMPLE 2

A bore hole of 8¾-inches is being drilled with a 4-inch drill pipe at 6000 feet into a geothermal formation having a bottom-hole temperature of about 440° F. and a bottom-hole formation pressure of about 400 psig. Because the bottom-hole formation pressure is far below the hydrostatic pressure possible at that depth, the use of conventional dense drilling mud is precluded; and because of the accumulation of water in the bore hole, the use of air or gas as the sole drilling fluid would not be effective in removing the water and debris from the bottom of the bore hole.

At the surface, 39.5 gallons per minute of a 1 weight percent solution of sodium lauryl sulfoacetate and 3600 standard cubic feet per minute of air are simultaneously injected into the drill pipe at an elevated pressure of about 700 psig. Both fluids mix as they travel down the drill pipe together, and emerge from the drill bit producing a more than sufficient amount of a foam that does not deteriorate at the high temperature encountered in the well bore.

When the foam emerges from the drill bit, it is at a temperature of about 440° F. and a pressure of about 400 psig. At these bottom-hole conditions, the foam contains about 96 volume percent of air and 4 volume percent of foaming solution. The foam carries away accumulated liquids and drill cuttings from the bottom of the bore hole and travels up the bore hole annulus at a velocity of about 400 feet per minute.

As the foam travels up the bore hole annulus, it is cooled by contact with the cooler formation and by heat exchange with the countercurrent flow of the cooler injected fluids traveling down the drill pipe. The pressure also decreases as the foam travels up the annulus. At the surface, the temperature of the foam has decreased to about 370° F. and due to the back pressure maintained by the outlet valve in the foam outlet, the pressure of the foam at the surface is about 200 psig. By maintaining the pressure sufficiently high within the bore hole annulus, the liquid phase of the foam will be prevented from flashing.

Various embodiments and modifications of this invention have been described in the foregoing description, and further modifications will be apparent to those skilled in the art. Such modifications are included within the scope of this invention as defined by the following claims.

Having now described the invention, we claim:

1. In the method of conducting foam drilling and workover operations in a bore hole penetrating a subterranean formation having a temperature above about 400° F, wherein foam is generated by contacting an aqueous solution of a foaming agent with a gas, and said foam is caused to flow upwardly through the bore hole carrying solid and liquid materials out of the bore hole, the improvement which comprises employing in said aqueous solution as said foaming agent a composition having the formula:

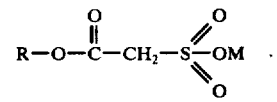

wherein R is a straight chain alkyl radical having from 10 to 16 carbon atoms; and M is an alkali metal or ammonium cation.

2. The method defined in claim 1 wherein R is a n-dodecyl radical.

3. The method defined in claim 1 wherein said foaming agent is sodium lauryl sulfoacetate.

4. The method defined in claim 1 wherein said aqueous solution contains about 0.5 to 2 weight percent of said foaming agent.

5. The method defined in claim 1 wherein said formation is a geothermal formation.

6. In the method of conducting foam drilling and workover operations in a bore hole penetrating a subterranean formation having a temperature above about 400° F., wherein foam is generated by contacting an aqueous foaming agent solution with a gas, and said foam is caused to flow upwardly through the bore hole carrying solid and liquid materials out of the well bore, the improvement wherein said aqueous foaming agent comprises about 0.25 to 10 weight percent of a foaming agent having the formula:

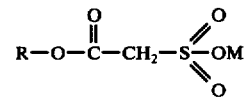

wherein R is a straight chain alkyl radical having from 10 to 16 carbon atoms; and M is an alkali metal or ammonium cation.

7. The method defined in claim 6 wherein said formation is a geothermal formation.

8. The method defined in claim 6 wherein said foaming agent is sodium lauryl sulfoacetate.

9. The method defined in claim 8 wherein the concentration of sodium lauryl sulfoacetate in said aqueous solution is about 0.5 to 2 weight percent.

* * * * *